(12) United States Patent
Litzenberger et al.

(10) Patent No.: US 10,484,456 B2
(45) Date of Patent: Nov. 19, 2019

(54) SHARING A CONTENT ITEM

(71) Applicant: Dropbox, Inc., San Francisco, CA (US)

(72) Inventors: Dwayne Litzenberger, San Francisco, CA (US); Matt Holden, San Francisco, CA (US); David Euresti, San Francisco, CA (US); Maxime Larabie-Belanger, San Francisco, CA (US); Ambrus Csaszar, San Francisco, CA (US); Peter Welinder, San Francisco, CA (US); Bryan Jadot, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 376 days.

(21) Appl. No.: 15/463,927

(22) Filed: Mar. 20, 2017

(65) Prior Publication Data

US 2017/0195402 A1    Jul. 6, 2017

Related U.S. Application Data

(63) Continuation of application No. 14/203,442, filed on Mar. 10, 2014, now Pat. No. 9,628,560.
(Continued)

(51) Int. Cl.
*H04L 29/08* (2006.01)
*H04W 4/60* (2018.01)
*G06F 16/955* (2019.01)

(52) U.S. Cl.
CPC ........... *H04L 67/06* (2013.01); *G06F 16/955* (2019.01); *H04L 67/10* (2013.01);
(Continued)

(58) Field of Classification Search
CPC ....................................................... H04L 67/06
See application file for complete search history.

(56) References Cited

U.S. PATENT DOCUMENTS

| | | | | |
|---|---|---|---|---|
| 2010/0082478 | A1* | 4/2010 | Van Der Veen | G06F 21/10 705/39 |
| 2012/0284357 | A1 | 11/2012 | Meisels et al. | |
| 2012/0331108 | A1* | 12/2012 | Ferdowsi | H04L 67/06 709/219 |

FOREIGN PATENT DOCUMENTS

JP        2007-108905 A      4/2007

OTHER PUBLICATIONS

PCT International Search Report and Written Opinion, dated Jul. 15, 2014, in corresponding International Application No. PCT/US2014/022867, filed Mar. 10, 2014, entitled, "Sharing a Content Item", 9 pages.

* cited by examiner

*Primary Examiner* — Suraj M Joshi
(74) *Attorney, Agent, or Firm* — Polsinelli PC

(57) ABSTRACT

A content item on a content management system can be shared using a generated sharing link. The sharing link can be a custom network address, such as a uniform resource locator (URL), which allows the content item to be accessed without authentication. The sharing index and a content path of the content items can be listed in a sharing index used to identify the content upon a request initiated by the sharing link. The content management system can generate a content link to a content item upon receiving a sharing input from a user indicating the user wants to share a content item. Alternatively, in some embodiments, sharing links can be pre-generated by the content management system and stored on the client device. The sharing link can stored directly to
(Continued)

a data buffer on the client device, such as a clipboard, where it can be accessed by the user.

20 Claims, 11 Drawing Sheets

Related U.S. Application Data

(60) Provisional application No. 61/775,367, filed on Mar. 8, 2013.

(52) U.S. Cl.
CPC ...... *H04L 67/1095* (2013.01); *H04L 67/1097* (2013.01); *H04L 67/146* (2013.01); *H04W 4/60* (2018.02)

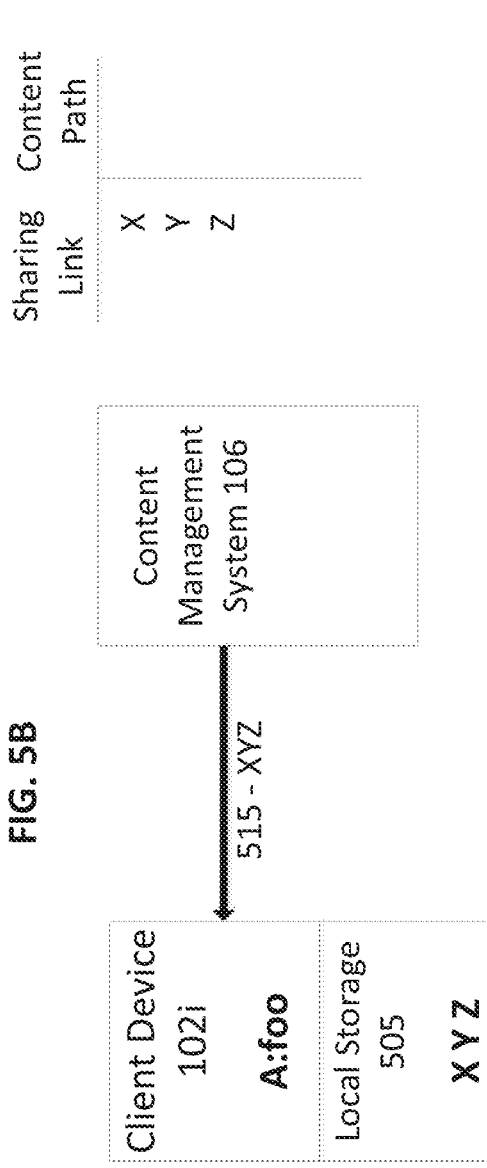

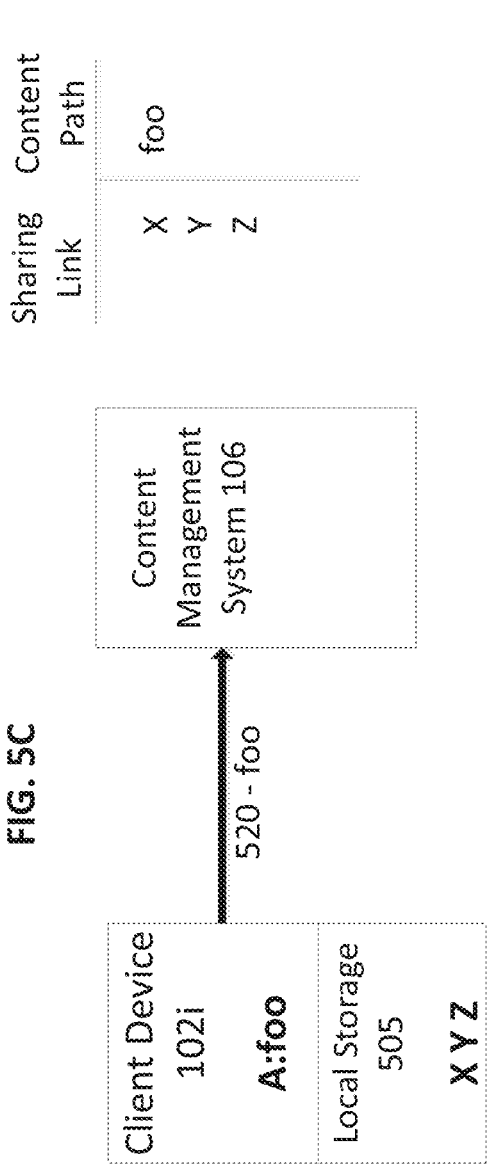

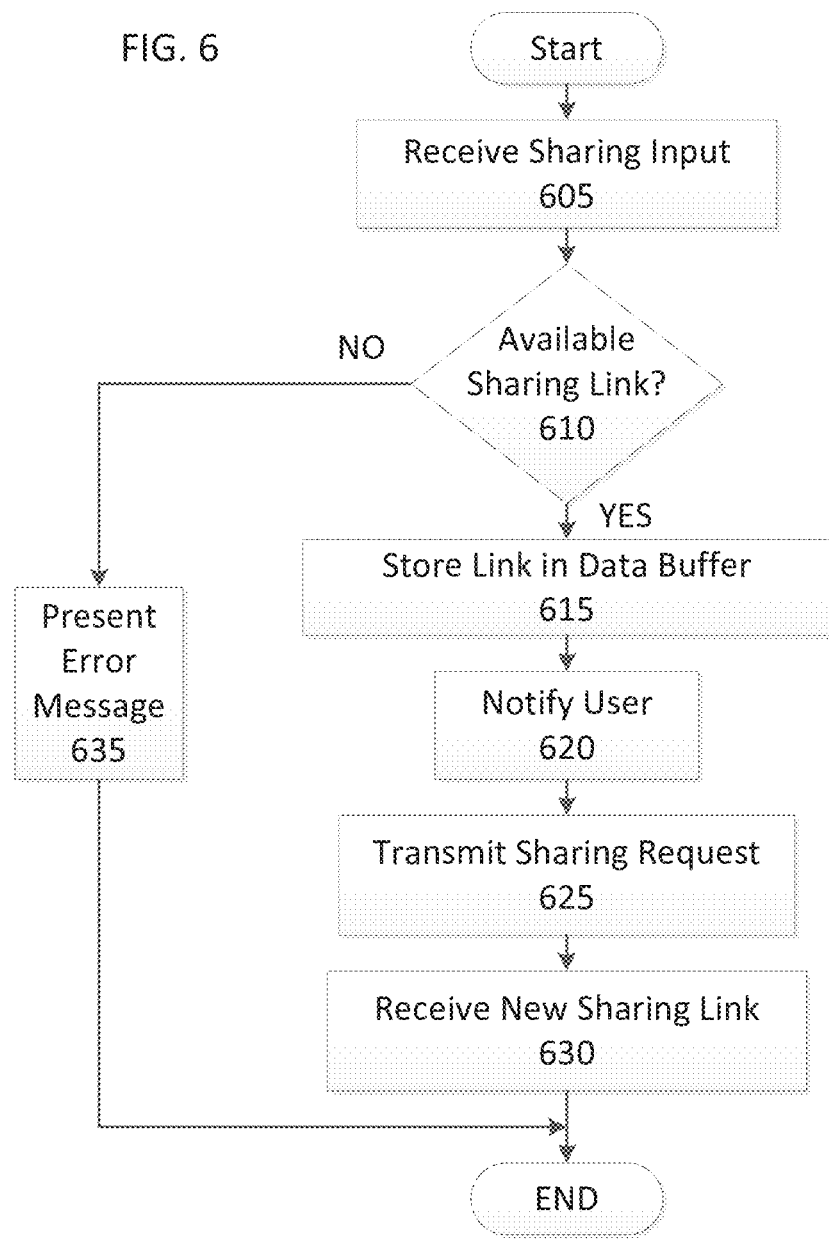

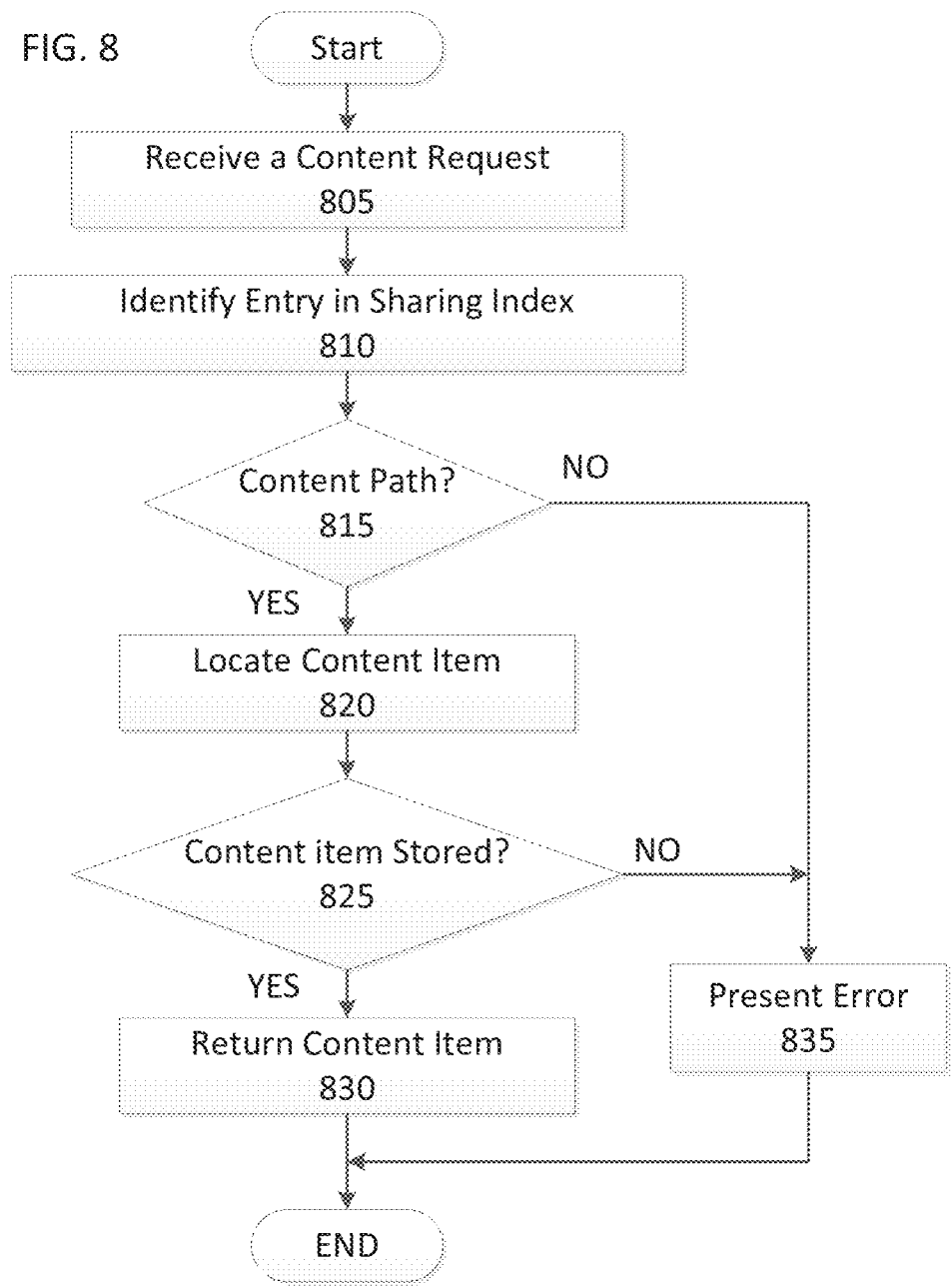

SHARING A CONTENT ITEM

CROSS REFERENCE TO RELATED APPLICATIONS

This application is a continuation of U.S. application Ser. No. 14/203,442, filed on Mar. 10, 2014, entitled, "SHARING A CONTENT ITEM," which claims priority to U.S. Provisional Application No. 61/775,367, filed on Mar. 8, 2013, entitled, "SHARING A CONTENT ITEM"; both of which are expressly incorporated by reference herein in their entireties.

TECHNICAL FIELD

The present technology pertains to sharing content items, and more specifically pertains to creating a sharing link to a content item.

BACKGROUND

Cloud storage accounts allow users to store their content items in an online storage account that can be accessed from any computing device with a network connection. Users can thus upload content items such as pictures, songs, documents, etc. from a computing device to their online storage account and later access the content items from different computing devices.

In addition to enabling a user to access their content items from multiple computing devices, cloud storage accounts can also enable a user to share their content items with other users. For example, users can create links to their content items that can be used to access the shared content items. A user can provide the links to other uses to provide access to the content item.

Current systems of sharing a content item can be difficult to use, which can deter users from sharing their content items. For example, some systems require users to navigate a difficult user interface to create a sharing link to a content item. Further, a network connection may be required to create a sharing link. Some systems can require that the user wait for a content item to be uploaded to the content management system prior to providing a sharing link to a user. Accordingly, an improved method of sharing a content item is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for sharing a content item. To enable a user to share a content item with other users, a content management system can be configured to create a sharing link that is a custom network address, such as a uniform resource locator (URL), which allows the content item to be accessed without authentication. The sharing link can be configured to request the content item from the content management system.

The content management system can use the sharing link to identify the content item and return it to a requesting user device. For example, the content management system can include a sharing index that lists each sharing link along with a content path identifying the location of the content item associated with the sharing link. The content management system can thus use the sharing link received from a requesting client device to search the sharing index and return the content item.

In some embodiments, the content management system can generate a content link to a content item upon receiving a sharing input from a user indicating that the user wants to share a content item. A sharing input can be received as a result of a user selecting a user interface element, such as a button, provided with a content item and prompting a user to share the content item. In some embodiments, the user interface element can be configured to appear when a user scrolls over a content item. In some embodiments, the user interface element can be presented as a window that appears upon a user right-clicking on the content item. In some embodiments, the sharing input can be received as a result of the user using a keyboard shortcut.

Upon receiving the sharing input, a client device can send a sharing request to a content management system to generate a sharing link for the content item. The content management system can generate the sharing link and return it to the client device to be presented to the user.

Alternatively, in some embodiments, the content management system can pre-generate sharing links that are stored on the client device. Upon receiving a sharing input from a user, the client device can provide one of the locally stored sharing links rather than requesting that a new sharing link be generated by the content management system. The client device can then send a sharing request to the content management system that identifies the sharing link provided to the user as well as a content path identified with the shared content item. The content management system can use the data received in the sharing request to update the sharing index to associate the content path with the sharing link.

A sharing link can be provided to a user in multiple ways. In some embodiments, the sharing link can be visually presented to the user. For example the sharing link can be presented as text on the client device that the user can copy to an e-mail, social networking post, etc., to share the content item. Alternatively, in some embodiments, the sharing link can be stored to a data buffer on the client device, such as a clipboard. The user can thus access the sharing link by using, for example, a paste function to enter the sharing link into an e-mail, social networking post, etc.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 5A-5C show an exemplary embodiment of providing a user with a sharing link stored in a local memory on a client device;

FIG. 6 shows an exemplary method embodiment of a client device providing a user with a sharing link stored in a local memory;

FIG. 8 shows an exemplary method embodiment of returning a content item requested by a sharing link.

DESCRIPTION

Figure 1:
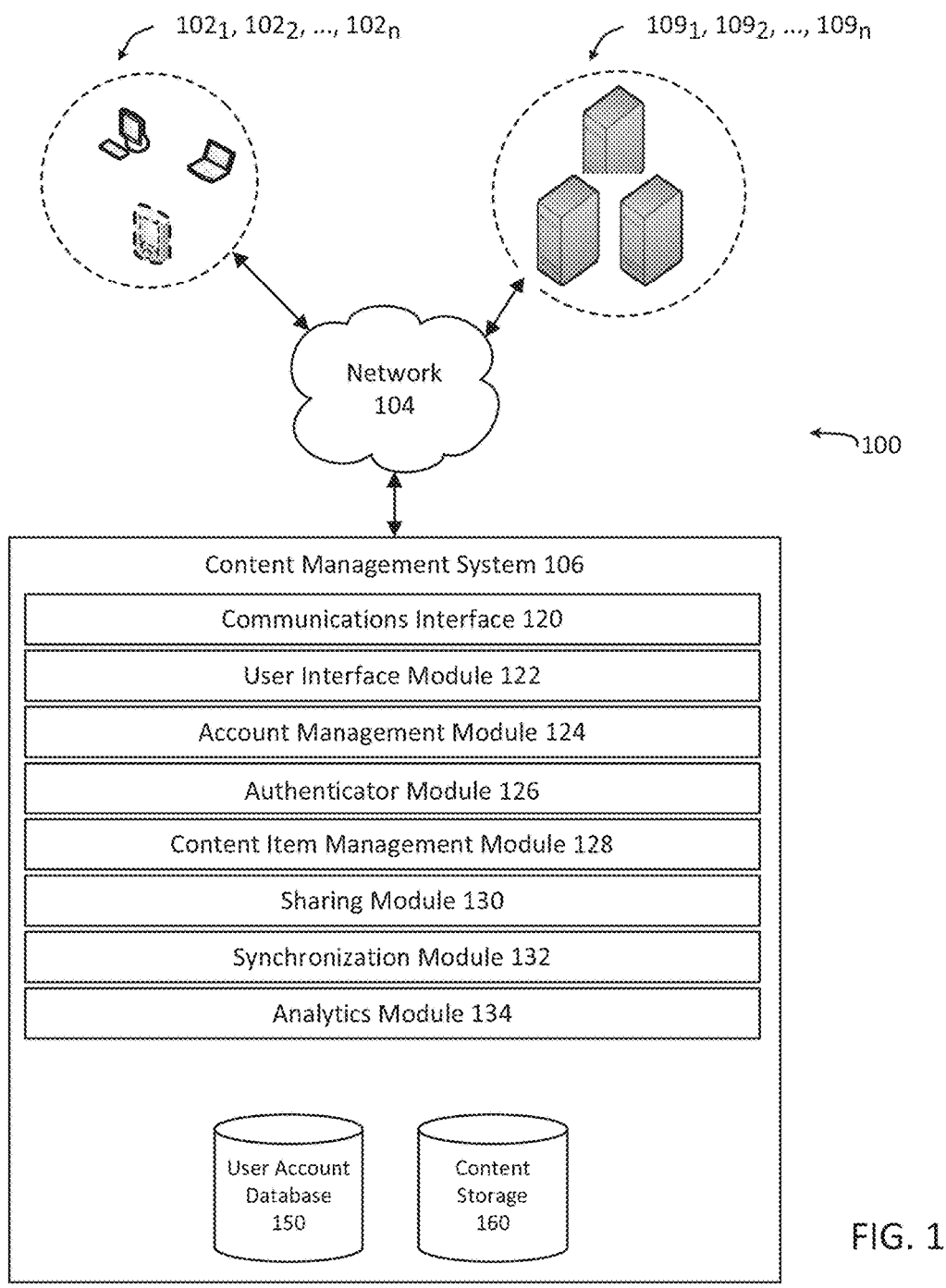
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for sharing a content item stored on a content management system. To enable a user to share the content item with other users, the content management system can be configured to create a sharing link that is a custom network address, such as a uniform resource locator (URL), which allows the content item to be accessed without authentication. The sharing link can be configured to request the content item from the content management system.

The content management system can use the sharing link to identify the content item and return it to a requesting user device. For example, the content management system can include a sharing index that identifies each created sharing link along with a content path identifying the location of the content item associated with the sharing link. The content management system can thus use the sharing link received from a requesting client device to search the sharing index and return the content item.

In some embodiments, the content management system can generate a sharing link to a content item in response to a user requesting to share the content item. For example, a sharing input received at a client device can indicate that a user wants to share a content item. Upon receiving the sharing input, a client device can send a sharing request to a content management system to generate a sharing link for the content item. The content management system can generate the sharing link and return it to the client device to be made available to the user.

Alternatively, in some embodiments, sharing links can be pre-generated by the content management system and stored on the client device prior to a user requesting to share a content item. Upon receiving a sharing input from a user requesting to share a content item, the client device can provide one of the locally stored sharing links rather than requesting that a sharing link be generated by the content management system. This can be advantageous because the sharing link can be made available to the user without having to wait for the content management system to create the sharing link. Further, the sharing link can be made available to the user while the client device is offline, i.e. is not in network communication with the content management system.

In some embodiments, the sharing link can be made available to a user in a data buffer on the client device, such as a clipboard. The client device can store the sharing link received from the content management system in the data buffer. The user can then easily access the sharing link through, for example, a paste function, to enter the sharing link into an e-mail, social networking post, etc.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, image files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in content storage 160. For example, the content path can identify the exact storage address of the content item in memory. In some embodiments, the content path can identify multiple locations in memory, each of which contains a portion of the content item.

Further, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

In addition to a content path, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share a content item publicly, sharing module 130 can be configured to generate a sharing link which can be used to access the content item. In some embodiments, a sharing link can be a custom network address, such as a uniform resource locator (URL), which allows the content item to be accessed without any authentication. The generated sharing link can be used to identify the content item associated with the sharing link. Upon generating the sharing link, sharing module 130 can create an entry in a sharing index. The entry can include the generated sharing link and a content path of the content item that can be used to identify the location of the content item on content management system 106. Upon receiving a request via the sharing link, content management system 106, can search for the sharing link in the sharing index to identify the location of the content item. Content management system 106 can thus return the content item to a requesting client device 102.

In some embodiments, a sharing link can be created upon a user requesting to share a content item. For example, client device $102_i$ can be configured to send a sharing request to content management system 106 upon receiving a sharing input requesting to share a content item. Upon receiving the sharing request from client device $102_i$, content management system 106 can be configured to create a sharing link and send the sharing link to client device $102_i$ which can be made available to the user to share the content item.

The sharing request sent to content management system 106 can include the content path of the content item identified by the sharing input. Upon receiving the sharing request from client device $102_i$, content management system 106 can be configured to generate a sharing link and create an entry in the sharing index including the generated sharing link and the content path received from client device $102_i$. Content management system 106 can send the created sharing link to client device $102_1$, which can be made available to the user to share the content item.

Figure 2:
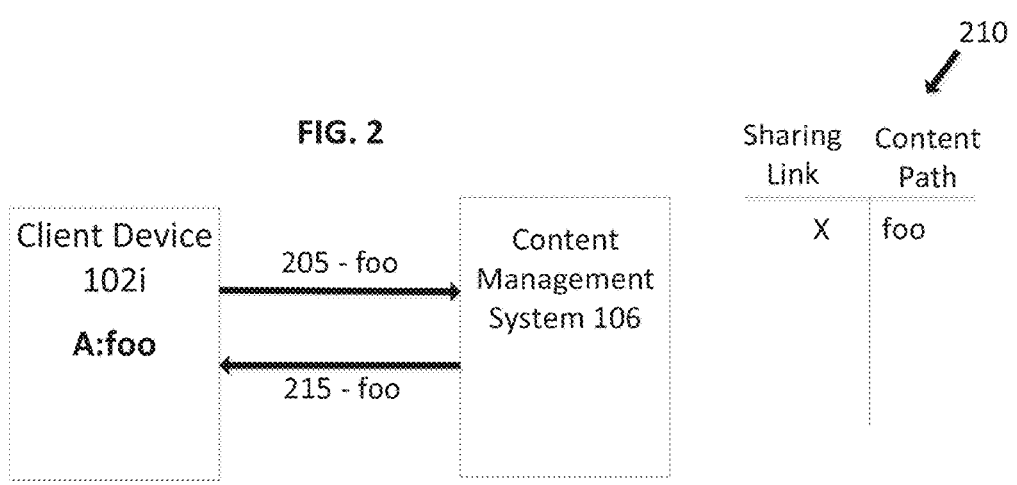
FIG. 2 shows a content management system creating a sharing link upon receiving a sharing request from client device.

FIG. 2 shows content management system 106 creating a sharing link upon receiving a sharing request from client device $102_i$. As shown client device $102_i$ includes content item 'A' that has content path 'foo'. To create a sharing link to content item 'A', client device $102_i$ can send sharing request 205 to content management system 106. Sharing request 205 can include the content path 'foo' for the content item 'A'.

In some embodiments, client device $102_i$ can send sharing request 205 in response to receiving a sharing input indicating that a user of client device $102_i$ would like to share a content item. The sharing input can identify the content item that the user wishes to share with other users. For example, in some embodiments, client device $102_i$ can present the user with a user interface element, such as button, enabling a user to share content item 'A'. Selection of the user interface element can result in the sharing input identifying content item 'A'.

Upon receiving sharing request 205, content management system 106 can generate a sharing link 'X'. Further, content management system 106 can add an entry in sharing index 210 including the generated sharing link 'X' and the content path 'foo' received from client device $102_i$. Content management system 106 can send the generated sharing link 'X' to client device $102_i$ in message 215. Client device $102_i$ can present the received sharing link 'X', which can be used to share content item 'A'.

Returning to the discussion of FIG. 1, in some embodiments, the sharing link returned to client device $102_i$ can be visually presented by client device $102_i$. For example, sharing module 130 can be configured to cause client device $102_i$ to present the sharing link in a window. A user can then easily share the content item by copying the sharing link to an e-mail, a post to a social networking site, etc.

In some embodiments, the sharing link can be stored in a data buffer on client device $102_i$ where it can be accessible from multiple applications executed on client device $102_i$. For example, the sharing link can be stored in a data buffer, such as a clipboard, and a user can use a paste function to include the sharing link in e-mails, social networking posts, etc.

In some embodiments, client device $102_i$ can be configured to allot an amount of time in which the sharing link must be created. For example, creation of a sharing link may be delayed due to lack of network connection, slow network connection, delay by content management system 106, etc.

To ensure that a user is not left waiting for the requested sharing link for an extended period of time, client device $102_i$ can be configured to set a timer upon sending the sharing request to content management system 106. If the sharing link is not returned to client device $102_i$ within the allotted amount of time after sending the sharing request to content management system 106, client device $102_i$ can be configured to present the user with an error message that the sharing link could not be created.

If the sharing link is returned to client device $102_i$ after the allotted amount of time has expired, client device $102_i$ can store the received sharing link in a local memory on client device $102_i$ for later user. For example, if the user later tries to publicly share the same content item, client device $102_i$ can retrieve the sharing link from the local memory and make the sharing link available to the user. Thus client device $102_i$ can make the sharing link available to the user without having to send a sharing request to content management system 106. In this type of embodiment, client device $102_i$ can be configured to check the local memory on client device $102_i$ for a sharing link to the content item prior to sending a sharing request to content management system 106.

Figure 3:
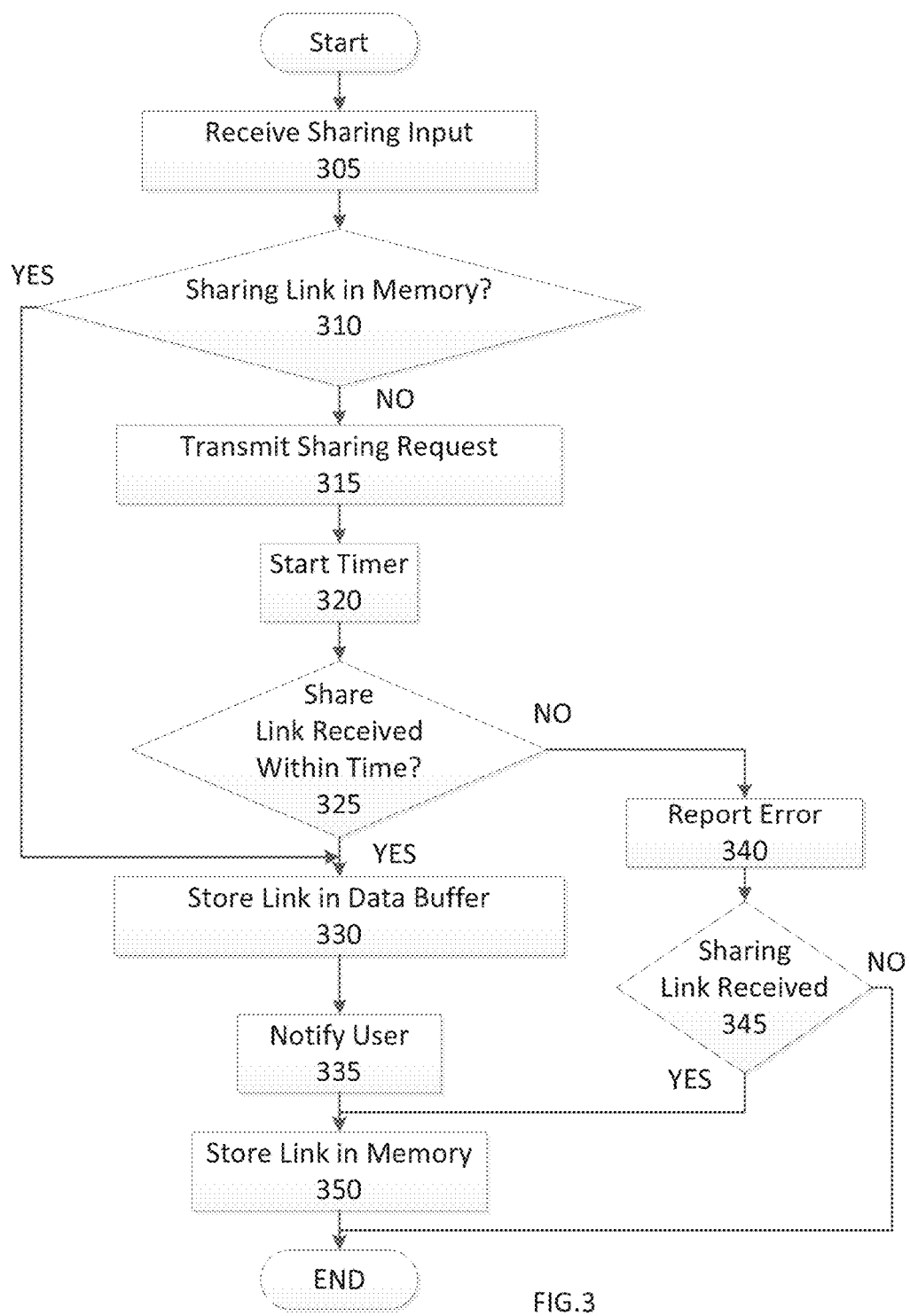
FIG. 3 shows an exemplary method embodiment of a client device providing a sharing link to a content item.

FIG. 3 shows an exemplary method embodiment of a client device providing a sharing link to a content item. Although specific steps are show in FIG. 3, in other embodiments a method can have more or less steps. As shown, the method begins at block 305 where a sharing input is received from a user. A sharing input can be an input received from the user requesting to publicly share a content item. For example, the sharing input can be received as a result of the user selecting a user interface element, such as a button, presented with the content item that prompts a user to share the content item.

Upon receiving the sharing input, the method continues to block 310 where the client device determines if a sharing link for the content item is stored in a local memory on the client device. For example, a user may have previously requested to publicly share the content item and a resulting sharing link can be stored in a local memory of the client device and associated with the content item. The client device can search the local memory to determine if a sharing link to the content item is stored in the local memory.

If at block 310 the client device determines that a sharing link to the content item is stored on the client device, the method continues to block 330 where a sharing link is stored in a data buffer, such as a clipboard, on the client device. The method then continues to block 335 where a notification that the sharing link has been created is presented to the user. The method then continues to block 350 where the received sharing link is stored in local memory and associated with the content item. The method then ends.

If at block 310, the client device determines that a sharing link to the content item is not present in local memory, the method continues to block 315 where the client device sends a sharing request to the content management system. A sharing request can include the content path of the content item.

At block 320 the client device can initiate a timer for receiving a response from the content management system. For example, the client device can allot a predetermined amount of time after sending the sharing request to receive a response including the sharing link from the content management system.

At block 325 the method determines if a sharing link was received within the predetermined amount of time allotted to receive a response from the content management system. If at block 325 it is determined that a sharing link was received within the predetermined amount of time, the method continues to block 330 where the client device stores the received sharing link in the data buffer. The method then continues to block 335 where the client device provides a notification to the user that the sharing link was stored in the data buffer. The method then continues to block 350 where the received sharing link is stored in local memory and associated with the content item. The method then ends.

Alternatively, if at block 325 a sharing link is not received within the allotted time, the method continues to block 340 where an error message is presented to the user. For example, the client device can present a message indicating that a sharing link could not be created and that the user can attempt to create the sharing link at a later time.

Although the sharing link was not received from the content management system within the allotted time, the content management system can still return the sharing link to the client device. For example, problems such as a network connection issue between the client device and the content management system can cause a delay that results in the sharing link being sent to the client device after the allotted time expires. Thus at block 345 the client device determines if a sharing link is received by the client device. If at block 345 a sharing link is not received from the content management system, the method ends.

If at block 345 a sharing link is received from the content management system the method continues to block 350 where the received sharing link is stored in local memory on the client device and associated with the content item. Thus if a user selects to share the content item in the future, the client device can provide the sharing link stored in local memory and a sharing request does not need to be sent to the content management system. The method then end.

Figure 4:
FIG. 4 shows an exemplary method embodiment of a content management system creating a sharing link upon receiving a sharing request from a client device.

FIG. 4 shows an exemplary method embodiment of a content management system creating a sharing link upon receiving a sharing request from a client device. Although specific steps are shown in FIG. 4, in other embodiments a method can have more or less steps. As shown, the method begins at block 405 where a sharing request is received by the content management system from a client device. A sharing request can be a request to create a sharing link for an identified content item. The sharing request can include the content path or other content item identifier for the content item that can be used to locate the content item.

Upon receiving the sharing request, the method continues to block 410 where the content management system generates the sharing link. The content management system can generate the sharing link in any of a variety of ways known in the art, however it is preferable that each sharing link generated be unique.

Upon creating the sharing link, the method continues to block 415 where the content management system creates a new entry in a sharing index. The sharing index can be a list of sharing links created by the content management system. The sharing index can further list the content path corresponding to each sharing link listed in the sharing index. The content management system can add a new entry to the sharing index that includes the sharing link created by the content management system as well as the content path received from the client device.

The method then continues to block 420 where the sharing link created by the content management system is sent to the client device, where it can then be provided to a user. The method then ends.

Returning to the discussion of FIG. 1, in some embodiments, a sharing link can be pre-cached in a local memory on client device $102_i$, which can be provided to the user upon receiving a sharing input. Pre-caching a sharing link on client device $102_i$ provides several advantages over requesting a sharing link from content management system 106 upon receiving a sharing input. For example, by pre-caching sharing links on client device $102_i$, client device $102_i$ can make a sharing link available to the user almost immediately without having to send a request to content management system 106. Thus, client device $102_i$ can make the sharing link available to the user almost immediately upon receiving a sharing input. Further, client device $102_i$ can make a sharing link available to the user even while client device $102_i$ is offline, i.e. client device $102_i$ is not in network connection with content management system 106.

To pre-cache sharing links on client device $102_i$, sharing module 130 can create a sharing link and send the sharing link to client device $102_i$. Client device $102_i$ can store the sharing links in a local memory on client device $102_i$. Further, sharing module 130 can create a new entry in the sharing index that only includes the created sharing link sent to client device $102_i$. Thus the new entry does not include a content path.

Upon receiving a sharing input, client device $102_i$ can make the sharing link stored in local memory available to the user. Client device $102_i$ can then send a sharing request to content management system 106 that includes the content path of the content item and the sharing link provided to the user. Upon receiving the sharing request, sharing module 130 can use the content path and sharing link to update the sharing index entry associated with the sharing link to include the content path received from client device $102_i$.

Figure 5A:
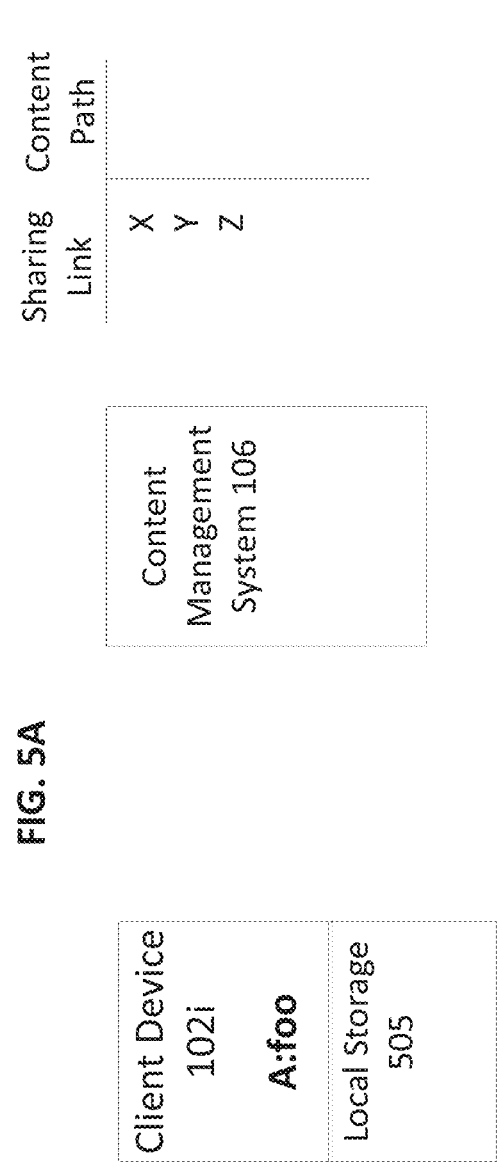

FIGS. 5A-5C show an exemplary embodiment of making a pre-cached sharing link available to a user. As shown, in FIG. 5A, client device $102_i$ includes content item 'A' with file path 'foo'. Client device $102_i$ includes local storage 505 that includes no sharing links.

Further, content management system 106 has created three sharing links, 'X', 'Y' and 'Z', and has also created an entry for each of the three sharing links in sharing index 510. As shown, each entry in sharing index 510 includes a value for a sharing link but no value for a content path.

FIG. 5B shows content management system 106 sending the three sharing links 'X', 'Y' and 'Z' to client device $102_i$ via message 515. As shown, the sent sharing links are stored on client device $102_i$ in local storage 505. Content management system 106 can send message 515 to client device at any time. For example, in some embodiments, content management system 106 can send message 515 to client device $102_i$ upon client device $102_i$ being authorized on a storage account managed by content management system 106.

FIG. 5C shows a pre-cached sharing link being made available upon client device $102_i$ receiving a sharing input form the user. Client device $102_i$ can receive a sharing input from a user to share content item 'A'. Upon receiving the sharing input, client device $102_i$ can search local memory 505 to identify any available sharing links. As shown, all three sharing links are available and client device $102_i$ can provide sharing link 'X' to the user.

Upon providing sharing link 'X' to the user in response to receiving the sharing input, client device $102_i$ can send sharing request 520 to content management system 106. Sharing request 520 can include the content path 'foo' of content item 'A' as well as the sharing link 'X' provided to the user.

Content management system 106 can use the sharing link 'X' and content path 'foo' to update sharing index 510. As shown, content management system 106 has updated the entry associated with sharing link 'X' to include the content path 'foo' received from client device $102_i$.

Further, in some embodiments, content management system 106 can send a new sharing link to replace sharing link 'X' stored in local memory 505 on client device $102_i$ in response to receiving sharing request 520. Alternatively, in some embodiments, client device $102_i$ can be configured to request new sharing links from content management system 106. For example, client device $102_i$ can be configured to request new sharing links from content management system upon a determination that the number of sharing links stored in local memory 505 is low; for example if only one unallocated sharing link is available.

FIG. 6 shows an exemplary method embodiment of a client device providing a user with a sharing link stored in a local memory. Although specific steps are show in FIG. 6, in other embodiments the method can have more or less steps. As shown, the method begins at block 605 where the client device receives a sharing input from a user that identifies a content item to be shared. Upon receiving the sharing input, the method continues to block 610 where the client device determines if an available sharing link is stored in the local memory on the client device. An available sharing link can be a sharing link that is not associated with a content item, i.e. the sharing link has not been provided to a user in response to a sharing input.

If at block 610 the client device determines that there are no available sharing links in the local memory, the method continues to block 635 where an error message is presented to the user. For example, the error message can alert the user that a sharing link cannot be provided at that time and the user should try again later. The method then ends.

If at block 610 the client device determines that there is an available sharing link stored in the local storage, the method continues to block 615 where the client device stores the available sharing link in a data buffer. The method then continues to block 620 where the client device notifies the user that the sharing link has been stored in the data buffer.

At block 625, the client device sends a sharing request to the content management system. The sharing request can include the sharing link and the content path associated with the content item. The method then continues to block 630 where a new sharing link can be received from the content management system. The new sharing link can be stored in the local storage and provided to a user in response to receiving future sharing inputs.

Figure 7:
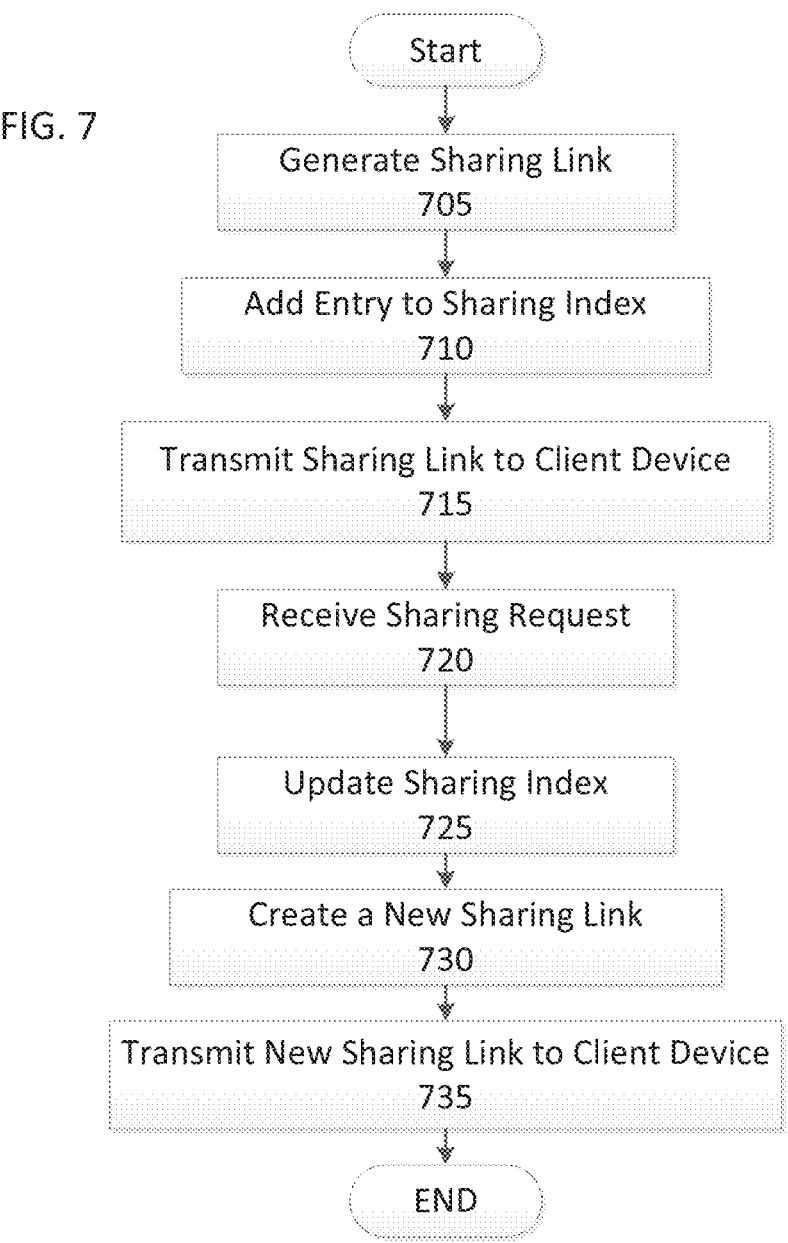
FIG. 7 shows an exemplary method embodiment of a content management system providing a user with a sharing link stored in a local memory on the client device.

FIG. 7 shows an exemplary method embodiment of a content management system providing a user with a sharing link stored in a local storage on the client device. Although specific steps are show in FIG. 5, in other embodiments the method can have more or less steps. As shown, the method begins at block 705 where the content management system generates a sharing link. The sharing link can be generated using any of a variety of known methods in the art, however in a preferred embodiment, each generated sharing link can be unique.

Upon generating the sharing link, the content management system can create a new entry in a sharing index. The sharing index can list sharing links generated by the content management system along with the content path of the content item to which the the respective sharing link provides access. The new content entry created by the content management system can include the generated sharing link and have no value for the content path.

Upon creating the entry in the sharing index, the content management system can send the sharing link to the client device, where it can be stored in a local memory on the client device.

At block 720, the content management system can receive a sharing request from the client device. The sharing request can include the sharing link along with a content path. The method then continues to block 725 where the content management system updates the entry in the sharing index associated with the sharing link to include the content path received from the client device. The method then ends, or, alternatively, is repeated.

Returning to the discussion of FIG. 1, one advantage of the disclosed technology is that a sharing link can be provided to a user without the content item itself being stored on content management system 106. For example, a user can select to share a content item on client device $102_i$ prior to the content item being uploaded to content management system 106.

Although the sharing link can be made available to the user, the sharing link will not provide access to the content until the content item is uploaded to content management system 106. Sharing module 130 can therefore be configured to determine if a content item requested via a sharing link is stored on content management system 106 and return an error message to a user if the content item is not stored on content management system 106.

In some embodiments, client device $102_i$ can be configured to create a share link to a content item as it is created on client device $102_i$. For example, a user can create a content item on client device $102_i$ using functionality provided by client device $102_i$, such as taking a picture with a camera of client device $102_i$ or by taking a screenshot of the screen presented on client device $102_i$.

Client device $102_i$ can be configured to regard creation of a content item on client device $102_i$ as a sharing input to share the newly created content item. Thus, upon a user creating a content item by, for example, taking a screenshot of client device $102_i$, client device can be configured to make a sharing link to the newly created client device available to the user. For example, in some embodiments, client device $102_i$ can send a sharing request to content management system 106 for a sharing link. Alternatively, in some embodiments, client device $102_i$ can make a pre-cached sharing link stored in local memory on client device $102_i$ available to the user of client device $102_i$.

Thus, upon a user creating a new content item, client device $102_i$ can make a sharing link to access the content item available by, for example, storing the sharing link in a data buffer on the client device. The user can then share the content item by pasting the sharing link stored in the data buffer into an e-mail, social networking post, etc.

While content management system 106 is presented with specific components, it should be understood by one skilled in the art, that the architectural configuration of system 106 is simply one possible configuration and that other configurations with more or less components are also possible.

FIG. 8 shows an exemplary method embodiment of returning a content item requested by a sharing link. Although specific steps are show in FIG. 5, in other embodiments a method can have more or less steps. As shown, the method begins at block 805 where a content item request is received at the content management system from a requesting client device. The content item request can be a request to access a publicly shared content item.

The content item request can be sent using a sharing link created to share the content item. For example, in some embodiments, the content item request can be sent upon a user selecting the sharing link. Alternatively, in some embodiments, the content item request can be sent upon a user entering the sharing link into a URL field in a web browser application.

Upon receiving the content item request, the method continues to block 810 where the content management system identifies the entry in the sharing index associated with the requested content item. For example, the content item request can include the sharing link and the content management system can use the sharing link to search the sharing index for the corresponding entry.

At block 815 the content management system determines if the identified sharing index entry includes a data path. For example, in embodiments in which the sharing link is provided to a user from a local memory on a client device, the client device may not have yet sent the content path of the content item to the content management system.

If at block 815 there is no content path included in the sharing index entry, the method continues to block 835 where an error message is returned to the requesting client device. The error message can indicate that the requested content item is not yet available.

If at block 815 the sharing index entry does include a content path, the method continues to block 820 where the content management system locates the content item using the content path. At block 825 the content management system determines if the content item is stored on the content management system.

If at block 825 it is determined that the content item is not stored on the content management system the method continues to block 835 where an error message is sent to the requesting user device. The error message can indicate that the content item is not yet stored on the content management system. In some embodiments, the error message can indicate an upload status of the content item. For example, the error message can indicate whether the content item has begun uploading, and if so, what percentage has completed uploading to the content management system. Further, the error message can include an estimated completion time of an upload.

If at block 825 the content management system determines that the content item is stored on the content management system, the method continues to block 830 where the content management system can return the content item to the requesting client device. The method then ends.

Figure 9A:
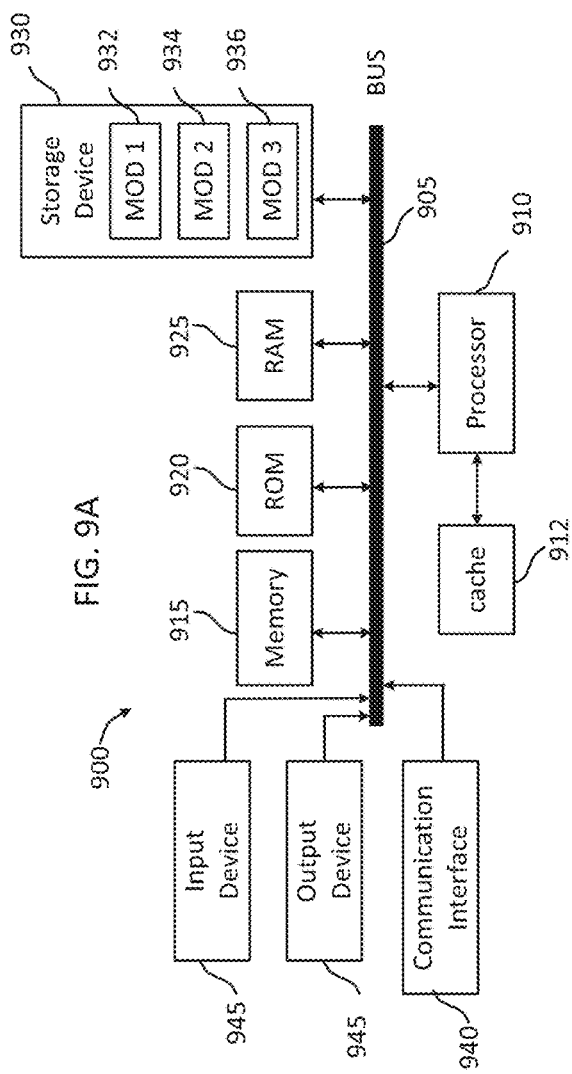
FIGS. 9A and 9B show exemplary possible system embodiments.
Figure 9B:
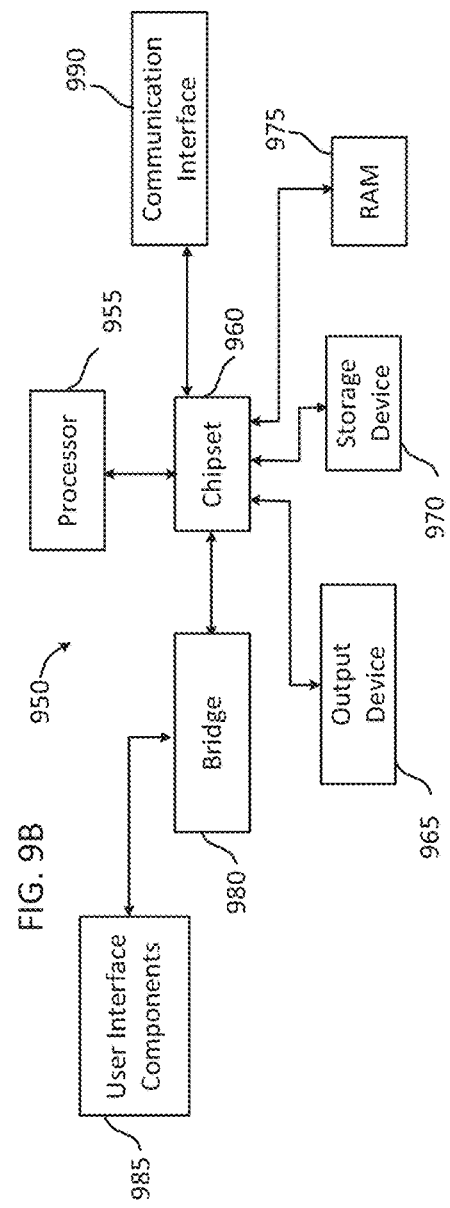

FIGS. 9A and 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
generating one or more sharing links for sharing one or more content items;
creating one or more entries in a sharing index at a content management system, the one or more entries corresponding to the one or more sharing links;
receiving, by the content management system from a first client device, a first content sharing request identifying a first sharing link having an entry in the sharing index, the first sharing link being associated with a content item corresponding to the first content sharing request, wherein the entry and the first sharing link do not include a content path of the content item;
determining that the first content sharing request specifies the content path of the content item associated with the first content sharing request; and
in response to determining that the first content sharing request specifies the content path, adding, by the content management system, the content path of the content item to the entry in the sharing index.

2. The method of claim 1, wherein at least one entry from the one or more entries comprises a respective content path of a second content item associated with a respective one of the one or more sharing links, the method further comprising:
receiving the content item from the first client device; and
after adding the content path to the entry, storing the content item at a location identified by the content path.

3. The method of claim 1, further comprising:
receiving, from a second client device, the first content sharing request identifying the first sharing link, wherein the first content sharing request is sent by the second client device in response to activating the first sharing link;
searching the sharing index for the first sharing link;
identifying the entry in the sharing index associated with the first sharing link;
retrieving, by the content management system, the content item from a location identified by the content path in the entry; and
sending, to the second client device, the content item from the location.

4. The method of claim 1, wherein the content management system implements a security policy configured to prevent unauthorized access to content items stored on the content management system, and wherein the first sharing link is configured to enable one or more client devices to access the content item on the content management system via the first sharing link without authenticating with the content management system according to the security policy.

5. The method of claim 1, further comprising:
receiving, from a second client device, a content item request identifying a second sharing link, wherein the content item request is triggered by an activation of the second sharing link by the second client device;
searching the sharing index for the second sharing link;
identifying a second entry that identifies the second sharing link;
determining that the second entry is missing a second content path identifying a storage location of a second content item associated with the second sharing link; and
notifying the second client device that the second content item is not available.

6. The method of claim 5, further comprising:
receiving from the first client device, the second content item and an indication of the second storage path;
storing the second content item at the storage location identified by the second content path;
updating the second entry to include the second content path for the second content item;
receiving, from the second client device, a second content item request identifying the second sharing link;
searching the sharing index for the second sharing link associated with the second content item request;
identifying the second entry identifying the second sharing link; and
returning, to the second client device, the second content item from the storage location associated with the second content path in the second entry.

7. A content management system comprising:
one or more processors; and
at least one memory storing instructions that, when executed by the one or more processors, cause the content management system to:
generate one or more sharing links for sharing one or more content items;
prior to obtaining a respective content path for at least one of the one or more sharing links, create, for the one or more sharing links, respective entries in a sharing index at a content management system, each of the respective entries identifying a respective sharing link;
receive, from a first client device, a first content sharing request identifying a first sharing link in a respective entry from the sharing index, the first sharing link being associated with a respective content item associated with the first content sharing request, wherein the respective entry does not include a content path of the respective content item;
determine that the first content sharing request specifies the content path of the respective content item associated with the first content sharing request; and
in response to determining that the first content sharing request specifies the content path, update the respective entry in the sharing index to include the content path.

8. The content management system of claim 7, wherein the one or more sharing links, when activated by a respective client device, cause the respective client device to send a respective sharing request to the content management system, wherein the first content sharing request is sent by the first client device upon the first client device activating the first sharing link.

9. The content management system of claim 7, wherein the respective entry is generated by the content management system prior to receiving the respective content item or the content path of the respective content item, the at least one memory storing additional instructions that, when executed by the one or more processors, cause the content management system to:
after updating the respective entry to include the content path of the respective content item:
receive the respective content item;
in response to receiving the respective content item, identify the content path for the respective content item in the respective entry; and
store the respective content item at a location identified by the content path.

10. The content management system of claim 7, the at least one memory storing additional instructions that, when executed by the one or more processors, cause the content management system to:
receive, from a second client device, a second request identifying the first sharing link;
search the sharing index for the first sharing link based on the second request;
identify the respective entry identifying the first sharing link;
retrieve the respective content item from the first content path in the respective entry; and
send the respective content item to the second client device.

11. The content management system of claim 7, the at least one memory storing additional instructions that, when executed by the one or more processors, cause the content management system to:
generate a second sharing link configured to send a second content item request to the content management system;
create a second entry in the sharing index, the second entry identifying the second sharing link; and
send the second sharing link to one or more client devices.

12. The content management system of claim 7, the at least one memory storing additional instructions that, when executed by the one or more processors, cause the content management system to:
receive, from a second client device, a content item request identifying a second sharing link, wherein the content item request is triggered by an activation of the second sharing link at the second client device, the second sharing link being associated with a second content item;
search the sharing index based on the second sharing link identified by the second content item request;
identify a second entry that identifies the second sharing link;
determine that the second entry is missing a respective content path identifying a storage location of the second content item; and
send, to the second client device, a notification indicating that the respective content path of the second content item is not available.

13. The content management system of claim 12, the at least one memory storing additional instructions that, when executed by the one or more processors, cause the content management system to:
receive, from the first client device, the second content item and a second indication of the second content path;
store the second content item at the storage location identified by the second content path;
receive, from the second client device, a second content item request identifying the second sharing link;
search the sharing index based on the second sharing link identified by the second content item request;
identify the second entry identifying the second sharing link; and
return, to the second client device, the second content item located at the storage location identified by the second content path in the second entry.

14. A non-transitory computer-readable storage medium comprising:
instructions stored thereon which, when executed by one or more processors, cause the one or more processors to:
generate one or more sharing links for sharing one or more content items;
create respective entries for the one or more sharing links in a sharing index at a content management system, each of the respective entries corresponding to a respective one of the one or more sharing links;
receive, from a first client device, a first content sharing request identifying a first sharing link having a respective entry in the sharing index, the first sharing link being associated with a respective content item associated with the first content sharing request, wherein the respective entry does not include a content path of the respective content item;
determine that the first content sharing request specifies the content path of the respective content item associated with the first content sharing request; and
in response to determining that the first content sharing request specifies the content path, adding the content path of the respective content item to the respective entry in the sharing index corresponding to the first sharing link.

15. The non-transitory computer-readable storage medium of claim 14, wherein the first sharing link, when activated, triggers an activating device to send the first content sharing request to the content management system, wherein the first content sharing request is sent by the first client device upon activation of the first sharing link.

16. The non-transitory computer-readable storage medium of claim 14, wherein the respective entry is pre-generated prior to obtaining the respective content item or the content path of the respective content item, the non-transitory computer-readable storage medium storing additional instructions which, when executed by the one or more processors, cause the one or more processors to:
in response to receiving the respective content item from the first client device:
determine whether the respective entry has been updated to include the content path;
based on a determination that the respective entry has been updated to include the content path, identify the content path from the respective entry and store the respective content item at the content path.

17. The non-transitory computer-readable storage medium of claim 14, storing additional instructions which, when executed by the one or more processors, cause the one or more processors to:
receive, from a requesting client device, a second content sharing request identifying the first sharing link;
search the sharing index based on the first sharing link;
identify the respective entry identifying the first sharing link;
retrieve the respective content item from the content path in the respective entry; and return, to the requesting client device, the respective content item from the content path in the respective entry.

18. The non-transitory computer-readable medium of claim 14, storing additional instructions which, when executed by the one or more processors, cause the one or more processors to:
- generate a second sharing link which, when activated, causes an activating device to send a second request to the content management system;
- create a second entry in the sharing index, the second entry identifying the second sharing link; and
- send the second sharing link to one or more client devices.

19. The non-transitory computer-readable storage medium of claim 14, storing additional instructions which, when executed by the one or more processors, cause the one or more processors to:
- receive, from a second client device, a content item request identifying a second sharing link associated with a second content item;
- search the sharing index based on the second sharing link identified by the content item request;
- identify a second entry that identifies the second sharing link;
- determine that the second entry is missing a second content path identifying a second location of the second content item associated with the second sharing link; and
- notify the second client device that the second content item is not available.

20. The non-transitory computer-readable storage medium of claim 14, wherein generating one or more sharing links for sharing one or more content items comprises:
- prior to receiving the first content sharing request:
  - pre-generating the first sharing link for the first client device to yield a pre-generated first sharing link; and
  - sending the pre-generated first sharing link to the first client device for storage at the first client device; and
- wherein the first content sharing request received identifies the pre-generated first sharing link.

* * * * *